United States Patent [19]

Murakami et al.

[11] Patent Number: 5,449,507
[45] Date of Patent: Sep. 12, 1995

[54] PROCESSES FOR PRODUCING GRAPHITE BLOCKS FROM GRAPHITIZABLE ORGANIC POLYMERS AND PROCESS FOR CARBONIZING GRAPHITIZABLE POLYMER FILMS

[75] Inventors: Mutsuaki Murakami, Tokyo; Toshiharu Hoshi; Kazuhiro Watanabe, both of Kawasaki; Naomi Nishiki, Kyoto; Katsuyuki Nakamura, Osaka; Hisashi Okada, Kyoto, all of Japan

[73] Assignees: Matsushita Electric Industrial Co., Ltd., Osaka; Research Development Corporation of Japan, Tokyo; Matsushita Electronic Components Co., Ltd., Osaka, all of Japan

[21] Appl. No.: 108,213

[22] Filed: Aug. 18, 1993

Related U.S. Application Data

[63] Continuation of Ser. No. 800,306, Nov. 29, 1991, abandoned.

[30] Foreign Application Priority Data

| Nov. 30, 1990 | [JP] | Japan | 2-330585 |
| Nov. 30, 1990 | [JP] | Japan | 2-330586 |
| Nov. 30, 1990 | [JP] | Japan | 2-330587 |
| Nov. 30, 1990 | [JP] | Japan | 2-330588 |
| Nov. 30, 1990 | [JP] | Japan | 2-330589 |

[51] Int. Cl.⁶ .................................. C01B 31/04
[52] U.S. Cl. .................................... 423/448
[58] Field of Search .......................... 423/448

[56] References Cited

U.S. PATENT DOCUMENTS 3,900,540  8/1975  Robba et al. .................. 423/448
4,983,244  1/1991  Murakami et al. ............. 423/448

FOREIGN PATENT DOCUMENTS

| 0360217 | 3/1990 | European Pat. Off. |
| 61-275114 | 12/1986 | Japan |
| 61-275115 | 12/1986 | Japan |
| 61-275117 | 12/1986 | Japan |
| 1-105199 | 4/1989 | Japan |
| 1-203208 | 8/1989 | Japan |
| 2-83207 | 3/1990 | Japan |
| 2-83208 | 3/1990 | Japan |

*Primary Examiner*—Wayne Langel
*Assistant Examiner*—Stuart L. Hendrickson
*Attorney, Agent, or Firm*—Lowe, Price, LeBlanc & Becker

[57] ABSTRACT

A process for producing a graphite block from a plurality of graphitizable polymer films or a plurality of carbonaceous films separately obtained from graphitizable polymer films is described. The method comprises superposing the plurality of the graphitizable polymer films or the plurality of the carbonaceous films, and thermally treating the plurality of the graphitizable polymer films or the plurality of the carbonaceous films in a substantially compression pressure-free condition when the treating temperature is in the thermal carbonization temperature range and the graphitization temperature range and under compression pressures in temperature ranges between the thermal carbonization temperature and the graphitization temperature ranges and over the graphitization temperature range. The compression pressure over the graphitization temperature range should be higher than that in the range between the thermal carbonization and graphitization temperature ranges. By this, a wrinkle-free graphite block with a good rocking characteristic is obtained.

18 Claims, 1 Drawing Sheet

PROCESSES FOR PRODUCING GRAPHITE BLOCKS FROM GRAPHITIZABLE ORGANIC POLYMERS AND PROCESS FOR CARBONIZING GRAPHITIZABLE POLYMER FILMS

This application is a continuation of application Ser. No. 07/800,306 filed Nov. 29, 1991 now abandoned.

BACKGROUND OF THE INVENTION

1. Field of the Invention

This invention relates to a process for producing graphite blocks which have utility as X-ray and neutron ray monochromators, neutron ray filters and the like radiation optical devices. The invention also relates to a process for carbonizing graphitizable polymer films.

2. Description of the Prior Art

Graphite has an important position as industrial materials because of its outstanding heat and chemical resistances and high electric conductivity, and has been widely used as gaskets, electrodes, heating elements and structural materials. Especially, highly oriented graphite has good spectral and reflective characteristics and has been thus used as X-ray or neutron ray monochromators, filters and the like. Natural graphite may be used for such purposes. Natural graphite with high quality occurs in an extremely limited amount and is intractable because of its powder or flaky form. Therefore, efforts of producing artificial graphite have been heretofore made.

One of the production processes of artificial graphite is one which includes pyrogenic deposition of hydrocarbons in a vapor phase and hot working of gaseous hydrocarbons. In the process, re-annealing is effected at a temperature of 3400° C. for a long time under pressure. Graphite thus obtained is called highly oriented pyrographite (HOPG) and has almost the same properties as those of natural graphite. However, this process has the disadvantage that the manufacturing process is very complicated with a low yield, so that the production costs become very high.

In order to solve the problems involved in the above process and to produce graphite easily and inexpensively, processes for producing high-quality graphite by heating polymer films have been developed and proposed. Organic polymers usually belong to non-graphitizable materials. It has been generally accepted that these non-graphitizable materials are not converted into high-quality graphite when heated to high temperatures, for example, of 3000° C. Recent studies made by us have revealed that some kinds of polymer materials can be converted to graphite of high quality by appropriately controlled thermal treatment. It was found that the polymers which are graphitizable include, for example, polyoxadiazole, aromatic polyimides, aromatic polyamides, polybenzoimidazole, polybenzobisthiazole, polybenzooxazole, polythiazole, poly-p-phenylenevinylene and the like.

Based on this finding, we proposed graphitization of organic polymers, for example, in JP-A- 61-275114, 61-275115 and 61-275117.

On the other hand, fabrication of graphite blocks by hot pressing a plurality of superposed graphitizable polymer films has also been proposed in JP-A- 1-105199 and 63-235218.

However, graphite or graphite blocks, which are obtained by the procedures described in these laid-open applications, are not necessarily satisfactory. For instance, when a plurality of graphitizable polymer films are merely placed between a pair of substrates, caulked by means of bolts and thermally treated as set forth in JP-A-1-105199, there is not obtained a highly oriented graphite block. For obtaining a highly oriented graphite block, inner layers of the graphite should have regularly aligned crystals which are highly oriented. In addition, the respective layers should be strongly bonded together. The thermal treatment by mere application of pressure will result in a film which is wrinkled or involves an internal strain. In the worst case, the film will be broken. Thus, it is very difficult to obtain a graphite block having good properties.

SUMMARY OF THE INVENTION

It is accordingly an object of the invention to provide a process for producing a highly oriented graphite block whose inner layers are strongly bonded together whereby good quality is ensured.

It is another object of the invention to provide a process for producing a graphite block which is substantially free of any wrinkle and any internal strain and which has a high degree of orientation.

It is a further object of the invention to provide a process for producing a graphite block which exhibits a good rocking characteristic and is very suitable for use as X-ray or neutron ray monochromators, neutron ray filters and the like.

It is a still further object of the invention to provide a process for carbonizing a plurality of graphitizable polymer films whereby the resultant carbonaceous block has uniform characteristic properties throughout the block.

Broadly, the present invention provides a process for producing a graphite block from a plurality of graphitizable polymer films or a plurality of carbonaceous films separately obtained from graphitizable polymer films which comprises:

superposing the plurality of the graphitizable polymer films or the plurality of the carbonaceous films; and thermally treating the plurality of the graphitizable polymer films or the plurality of the carbonaceous films in such a way that the thermal treatment is effected in substantially compression pressure-free conditions in thermal carbonization and graphitization temperature ranges where the films suffer a substantial dimensional change, and under compression pressures in temperature ranges between the thermal carbonization range and the graphitization temperature range and over the graphitization temperature range, where the films suffer little dimensional change, provided that the compression pressure in the temperature range over the graphitization temperature range is higher than the compression pressure in the temperature range between the thermal carbonization range and the graphitization temperature range.

In accordance with a more specific embodiment of the invention, there is also provided a process for producing a graphite block from a plurality of graphitizable polymer films or a plurality of carbonaceous films separately obtained from graphitizable polymer films which comprises:

superposing the plurality of the graphitizable polymer films or the plurality of the carbonaceous films; and thermally treating the plurality of the graphitizable polymer films or the plurality of the carbonaceous films at a compression pressure in a temperature range of from a carbonization temperature of the graphitizable films used to approximately 2000° C., then under a substantially compression pressure-free condition in a temperature range of from approximately 2000° C. to approximately 2600° C., and at a compression pressure in a temperature range over approximately 2600° C. provided that the compression pressure in the temperature range over approximately 2600° C. is higher than the compression pressure in the temperature range of from the carbonization temperature to approximately 2000° C., thereby obtaining a graphite block.

BRIEF DESCRIPTION OF THE INVENTION

The sole FIGURE is a graphical representation of the variation in film length and the graphitization rate in relation to the variation in the thermal treatment temperature.

DETAILED DESCRIPTION AND EMBODIMENTS OF THE INVENTION

Figure 1:
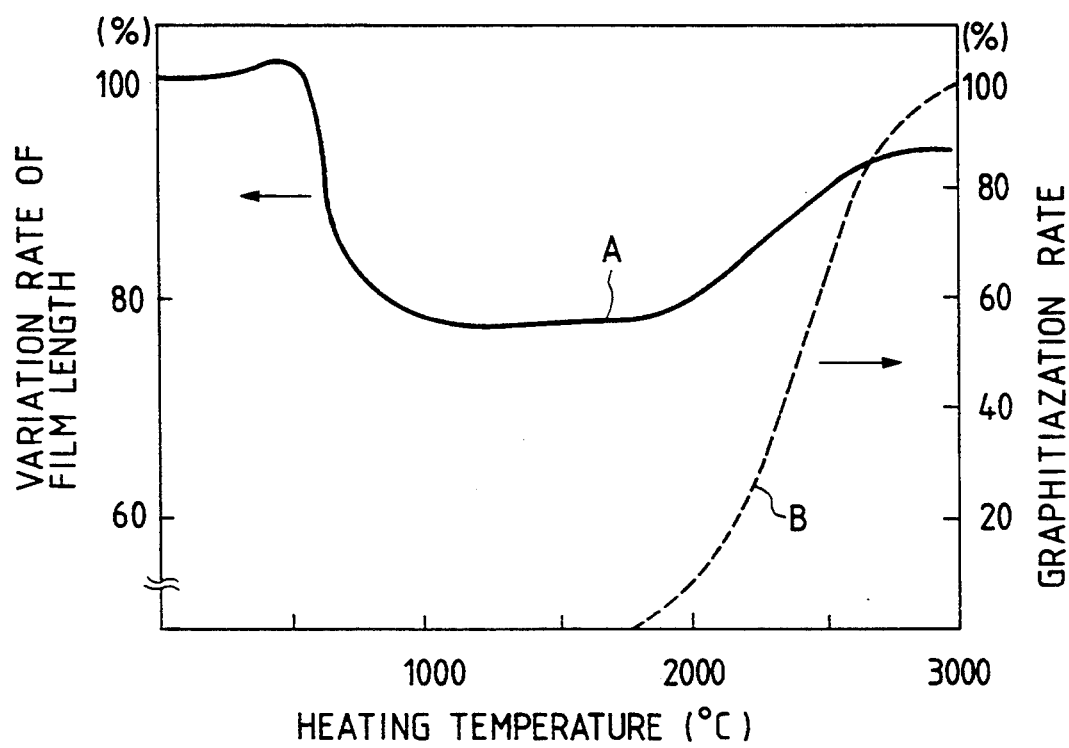

In the process according to a first embodiment of the invention, a plurality of graphitizable polymer films or carbonaceous films are used as a starting material.

With the carbonaceous films, graphitizable polymer films are separately carbonized one by one or in a stacked form of a plurality of the polymer films to provide carbonaceous films, and a plurality of the carbonaceous films are superposed. For the carbonization, the graphitizable polymer films may be most simply heated to 1000° C. or below. Alternatively, a procedure which will be described hereinafter may be used for this purpose.

The plurality of the graphitizable polymer films or the plurality of the carbonaceous films are applied with a compression pressure only in temperature ranges where the films undergo little dimensional change, thereby obtaining a graphite block. It will be noted that with the carbonaceous films which have once undergone a carbonization treatment, they may be immediately followed by further thermal treatments under different compression pressure conditions. Alternatively, the carbonaceous films may be removed from a treating system and cooled down to normal temperatures. In the latter case, the carbonaceous films are thermally treated in the same manner as graphitizable polymer films although the carbonization step may not be necessary.

In practice, the superposed films are hot pressed in temperature ranges where the films do not suffer a significant degree of shrinkage or expansion as will be described in detail hereinafter.

The graphitizable polymers used in the present invention include polyphenylenoxadiazoles (POD), polybenzothiazole (PBT), polybenzobisthiazole (PBBT), polybenzooxazole (PBO), polybenzobisoxazole (PBBO), aromatic polyimides (PI), aromatic polyamides (PA), polyphenylenbenzoimidazole (PBI), polyphenylenebenzobisimidazole (PPBI), polythiazole (PT), poly-p-phenylenevinylene (PPV) or mixtures thereof. As a matter of course, any graphitizable polymer which is convertible into graphite with good quality may be used as a starting film of the invention.

Of these, polyphenyleneoxadiazoles are preferred including poly-p-phenylene-1,3,4-oxadiazole and polymers of isomers thereof. Also, there are preferably used polyimides having the recurring units of the following formula

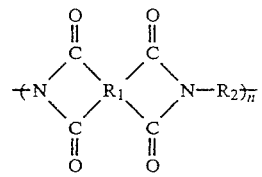

wherein $R_1$ represents

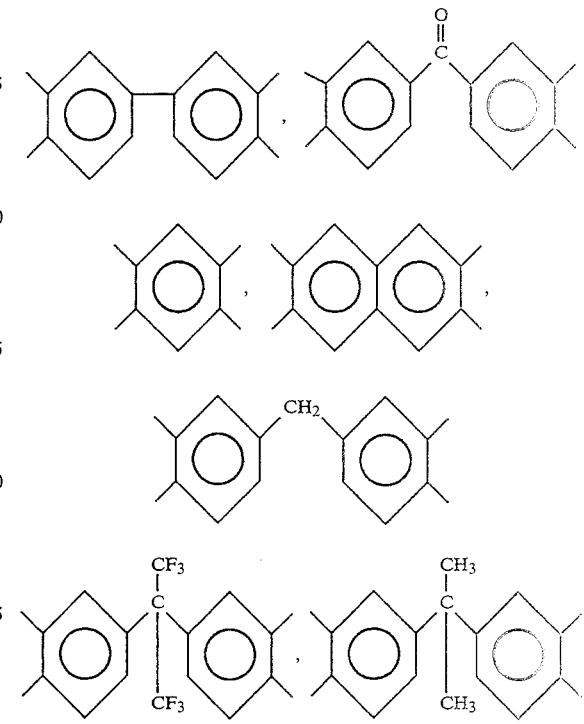

and $R_2$ represents

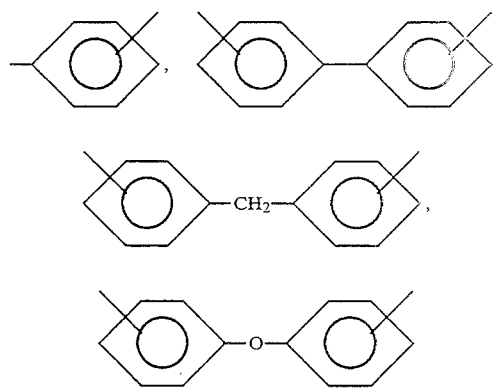

Likewise, there are preferably used aromatic polyamides having the recurring units of the following formula

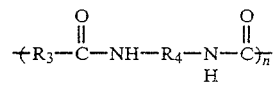

wherein $R_3$ represents

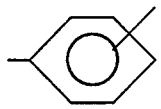

and R₄ represents

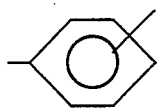

The starting film should preferably have a thickness of not larger than 400 μm. With the carbonaceous film, the film which is obtained from the polymer film having such a thickness as set forth above is preferably used. When the film thickness exceeds 400 μm, high orientation is difficult to attain because gases are generated in the respective films during thermal treatment and will break the internal structure of the films.

In the process of the invention, hot pressing is effected in temperature ranges where the films undergo little dimensional change, so that the carbon atoms in the respective graphite layers are regularly arranged, resulting in highly oriented crystals without involving any wrinkle and internal strain in or on the films as would otherwise occur owing to the substantial dimensional change.

How the compression pressure is applied in relation to the variation in temperature is now described with reference to the accompanying drawing. In this instance, a polyimide film is used, which is has a thickness of 25 μm and is commercially available from Du Pont de Nemours under the designation of Kapton.

In the FIGURE, the shrinkage or expansion along the length of the film in relation to the treating temperature is shown as solid line A. Similarly, the rate of graphitization of the film which is determined by X-ray diffraction analysis is shown as dotted line B.

As will be apparent from the curve A, the film is slightly elongated at a temperature of from approximately 400° to approximately 500° C. In a temperature range of from approximately 500° C. to approximately 700° C. which is a thermal carbonization temperature range of the film, the film length is abruptly reduced to an extent of approximately 75% of the original length. In a range of from the upper level in the decomposition temperature range, for example, of 700° to 1000° C. to approximately 2000° C., the film undergoes little dimensional change, i.e. it suffers little shrinkage or expansion. Further, in a range of from 2000° to 2600° C., the once shrunk film is expanded or elongated and is returned to approximately 90% of the original length. The expansion of the film in this temperature range has close relation with the progress of graphitization. As will be seen in curve B of the FIGURE, as the film is expanded, the graphitization rate sharply increases. Thus, the film undergoes the dimensional change in the temperature range of from approximately 2000° to approximately 2600° C. This range is called herein a graphitization temperature range. In a range over approximately 2600° C., little dimensional change is observed.

The tendency of the dimensional changes in relation to the heating temperature is similar for all the graphitizable polymers set forth before although the temperature ranges for the thermal carbonization and the graphitization may, more or less, vary depending on the type of graphitizable polymer film and the treating conditions including the heating rate.

A plurality of graphitizable polymer films which exhibit the dimensional changes as set out above are superposed or stacked and thermally treated in an atmosphere of an inert gas such as argon, nitrogen, helium or the like. In order to avoid the deficiencies as will be involved in a final graphite block such as, for example, wrinkles, internal strain and the like, it is fundamentally sufficient to subject the films to a compression treatment only in temperature ranges where little dimensional change takes place in the films. More particularly, when the polymer films are thermally transformed into carbonaceous films at a temperature, for example, of from about 500° to about 700° C., the films are thermally treated in a substantially pressure-free condition. On the other hand, the films are compressed in temperature ranges between the thermal carbonization and graphitization temperature ranges, preferably 700° C. to 2000° C., and over the graphitization temperature ranges, preferably over 2600° C., since any substantial dimensional change does not take place in the respective ranges. In these temperature ranges particularly over 2600° C. for graphitization, the film should be compressed so that the resultant crystals are oriented to a satisfactory extent. The compression treatment is not necessarily effected immediately after the films reach the temperatures at which the compression is possible, i.e. the temperatures of the carbonization temperature and also of 2600° C., but may be effected when the film is heated to a given temperature within the respective predetermined temperature ranges. In addition, it is not necessary that the compression be always continued during the time when or after the films have been heated to a predetermined temperature range between the carbonization temperature range and the graphitization temperature range, or over the graphitization temperature range.

At a temperature in the range between the carbonization temperature and the graphitization temperature range in which carbonization is completed, the films are compressed. However, since the film or films subsequently undergo a great dimensional change, the compression pressure in this temperature range should preferably be in a range as low as from 2 to 50 kg/cm² although the pressure may vary depending on the number of the superposed films. During the application of the compression pressure, the resultant block tends toward high orientation.

In a temperature range over the graphitization temperature range, preferably 2600° C., little dimensional change takes place as will be seen in the FIGURE and the film becomes softened, so that a compression pressure higher than the first-mentioned pressure is applied. Preferably, the compression pressure is not smaller than 50 kg/cm², more preferably from 100 to 500 kg/cm². The compression pressure in this high temperature range leads to strong bonding of the graphite layers formed during the thermal treatment.

The heating rate is preferably in the range of from 0.02° to 5° C./minute in the carbonization temperature range, for example, of from 500° to 700° C. or higher, from 10° to 40° C./minute in the temperature range of from the carbonization temperature to 2000° C., from 1° to 10° C./minute in the graphitization temperature range of from 2000° to 2600° C., and from 2° to 20° C./minute in the temperature range over 2600° C.

Graphitizable polymer films other than the polyimide film undergo a similar carbonization and graphitization process as set forth above. More particularly, the films of graphitizable polymers undergo a thermal carbonization step including shrinkage of the film, a step including little expansion or shrinkage of the film, a graphitization step including expansion of the film, and a final step wherein the graphitization has been substantially completed with little elongation or shrinkage.

It will be noted that in case where the films are in temperature ranges where it is expanded or shrunk, the films are thermally treated at a substantially compression pressure-free condition. However, if the temperature is not raised at a given rate and is maintained at a constant level, a compression pressure may be applied to the films in these temperature ranges since any elongation or shrinkage takes place.

In general, the number of polymer or carbonaceous films which are superposed is usually in the range of from several tens to 5000 depending on the thickness of each film.

Preferred embodiments of the invention are now described.

In accordance with a second embodiment of the invention, the superposed graphitizable polymer films or carbonaceous films are thermally treated under a compression pressure in a temperature range between the thermal carbonization and graphitization temperature ranges and preferably between the thermal carbonization temperature and 2000° C. in such a way that when the compression pressure is not lower than 10 kg/cm$^2$, a treating temperature is substantially maintained at a given level in this temperature range. The films are further thermally treated in a temperature range not lower than the graphitization range at a compression pressure in such a way that when the compression pressure is not less than 50 kg/cm$^2$, a treating temperature in this range is substantially maintained at a given level in the range. More preferably, when the films are thermally treated at a given level in a temperature range between the carbonization temperature of the film and the graphitization temperature range, preferably from 1000° C. to 2000° C., while applying a compression pressure in a range of not lower than 10 kg/cm$^2$ to 50 kg/cm$^2$, the given temperature level is substantially maintained. provided that the compression pressure is not lower than 10 kg/cm$^2$. In this case, it is more preferred that when the temperature level is not higher than 2000° C., its level is not substantially changed at a compression pressure of not lower than 2 kg/cm$^2$. Likewise, it is more preferred that at a temperature in the range between the thermal carbonization and graphitization ranges, the thermal treatment under compression pressure is effected so that the the temperature level is not substantially changed when the compression pressure is not lower than 20 kg/cm$^2$.

In this embodiment, the polymer or carbonaceous films are thermally treated in a substantially compression pressure-free condition when the temperature is not higher than the thermal carbonization temperature and also in the graphitization temperature range, preferably in a range of from 2000° to 2600° C.

In the process of the second preferred embodiment, the treating temperature is substantially kept constant whenever the films are compressed in the ranges between the carbonization and graphitization temperature ranges and in the range over the graphitizable temperature range. Accordingly, the resultant graphite block has highly oriented graphite layers in the inside thereof. This is because the orientation of the graphite is not impeded as will occur owing to the difference in shrinkage or expansion between the jigs or fixtures and the polymer or carbonaceous films. In addition, since the compression is effected in a condition where the dimensional change does not take place, generation of wrinkles or internal strain can be suppressed to a minimum.

A third embodiment of the invention is described.

In this embodiment, the superposed films are compressed at a pressure of from 2 to 50 kg/cm$^2$ in a temperature range of from the thermal carbonization temperature to 2000° C., in a substantially compression pressure-free condition in a temperature range of from 2000° to 2600° C., at a pressure of not lower than 50 kg/cm$^2$ in a temperature range of from 2600° to 3000° C., and at a pressure of from 2 to 50 kg/cm$^2$ in a temperature range of not lower than 3000° C., preferably from 3000° to 3500° C., thereby obtaining a graphite block with better results with respect to the orientation and the bonding strength. In this embodiment, it is preferred that in at least one compression step, the treating temperature is substantially maintained at a given level in the temperature range, by which a more highly oriented graphite block can be obtained.

In a fourth embodiment of the invention, the superposed polymer films or carbonaceous films are graphitized by heating to over the graphitization temperature range, preferably over a temperature of 2600° C. as in the first embodiment, after which the films are lowered down to a temperature range of not higher than 1600° C. Subsequently, the thus lowered films are heated to a temperature range of not lower than 2600° C. The procedure of lowering down to not higher than 1600° C. and heating to a temperature not lower than 2600° C. may be repeated several times.

More particularly, the films are heated to a temperature range of from the carbonization temperature to 2000° C., preferably from 1000° C. to 2000° C., under a compression pressure, then to a range of from 2000° to 2600° C. in a substantially pressure-free condition, and to a temperature of not lower than 2600° C. under a compression pressure in the same manner as in the first embodiment. The thus heated films are cooled down to 1600° C. or lower. Thereafter, the thus cooled films are again heated to a temperature range of not lower than 2600° C. at which the films are at least once compressed. The procedure of the cooling down and heating to not lower than 2600° C. at which the films are at least once compressed is preferably repeated two or more times.

In this embodiment, the first compression is preferably effected in a range of from 2 to 50 kg/cm$^2$ at a temperature between the carbonization temperature and 2000° C. and in a range of not less than 50 kg/cm$^2$ in a temperature range of not lower than 2600° C. in the thermal treatment. The second compression in a temperature range of not lower than 2600° C. is preferably effected at a pressure of not less than 20 kg/cm$^2$. If the pressure is less than 20 kg/cm$^2$, the resultant graphite tends to become foamed.

In this embodiment, the films which have been once heated to not lower than 2600° C. are cooled down to a temperature of not higher than 1600° C. As a matter of course, the cooling to room temperature is possible, in which case a jig or fixture may be replaced by a fresh one. When the temperature is lowered, the compression pressure applied over 2600° C. should preferably be maintained to a temperature of 2000° C. At temperatures lower than 2000° C., the pressure may be removed since final characteristics are not adversely influenced by the removal. After the cooling down, the films are again heated to a temperature of not lower than 2600° C. and preferably to a maximum temperature attained before the cooling. In this case, when re-heated, the films are preferably compressed at a pressure not lower than 20 kg/cm$^2$ up to 2600° C. Over 2600° C., the compression pressure should preferably be not lower than 20 kg/cm$^2$.

In a fifth embodiment of the invention, there is provided a process for carbonizing a plurality of graphitizable polymer films.

In this embodiment, several hundreds to several thousands graphitizable polymer films are superposed and subjected to hot pressing in such a way that the films are thermally heated at a compression pressure as low as from 20 to 1000 g/cm$^2$ in a temperature range of not higher than the carbonization temperature of the polymer. It is preferred that the treatment in the temperature range not higher than the thermal carbonization temperature is effected in vacuum. The heating rate should preferably be not less than 10° C./minute, preferably from 0.02° to 5° C./minute,.

In this embodiment, a low compression pressure of from 20 to 1000 g/cm$^2$ is applied to a relatively large number of polymer films at a temperature lower than the thermal carbonization temperature of the polymer used. As a result, the polymer films are not broken prior to or after the thermal carbonization, thus leading to high orientation. In addition, gases generated during the thermal carbonization can be effectively removed to outside of the superposed block. This is effective in obtaining a graphite block which is substantially free of crystal defects, wrinkles in the inside thereof or voids caused by the wrinkles. Thus, when using the carbonaceous films, uniform characteristics of the block are ensured. For the graphitization, the processes of the foregoing embodiments can be used. The carbonaceous films obtained in this embodiment is preferably used as the starting carbonaceous films of the foregoing embodiments. Alternatively, the carbonaceous films may be thermally treated at temperatures higher than the graphitization temperature while keeping the temperature level constant for a time sufficient for the graphitization, thereby obtaining a graphite block with good characteristic properties.

The reason why the thermal treatment at temperatures lower than the thermal carbonization temperature is preferably effected in vacuum is that air or moisture contained in the stacked polymer films which are large in number and gases generated during the thermal carbonization can be effectively removed to outside.

Likewise, the reason why the heating rate is determined as not larger than 10° C./minute is that air or moisture or gases generated during the thermal carbonization cannot be expanded abruptly but are maintained without adversely influencing the films.

In addition, the polymer films are preferably hot pressed while keeping them for a time of from 10 to 120 minutes at the thermal carbonization temperature or in the vicinity thereof, by which gases generated during the thermal carbonization can be smoothly removed, thereby suppressing defects in the carbonaceous block to a minimum.

In this embodiment, the graphitizable polymers defined hereinbefore are likewise used, of which polyoxadiazoles, aromatic polyamides, aromatic polyimides and mixtures thereof are preferred.

The present invention is more particularly described by way of examples.

First, examples of the first embodiment are described.

EXAMPLE 1

Fifty films of poly-p-phenylene-1,3,4-oxadiazole each having a length of 2 cm, a width of 3 cm and a thickness of 50 $\mu$m were set by use of a graphite jig and fired in the following manner.

The films were heated to 1200° C. in an atmosphere of argon gas at a heating rate of 10° C./minute in such a way that the films were applied only with a pressure of 100 g/cm$^2$ based on the weight of the jig. After the temperature had reached 1200° C., a compression pressure of 20 kg/cm$^2$ was applied to the films to a temperature of 1400° C. while keeping the heating rate of 10° C./minute. Thereafter, the pressure was removed so that only the weight of the jig of 100 g/cm$^2$ was applied until the temperature reached 2600° C. After the temperature reached 2600° C., a compression pressure of 200 kg/cm$^2$ was applied to the films, followed by heating to 3000° C. while keeping the pressure of 200 kg/cm$^2$, thereby obtaining a graphite block.

EXAMPLE 2

Two hundreds films of an aromatic polyimide (Kapton H film, available form Du Pont De Nemours) with a length of 2 cm, a width of 3 cm and a thickness of 25 $\mu$m were set by use of a graphite jig and fired in the following manner.

The films were heated to 1400° C. in an atmosphere of argon gas at a heating rate of 10° C./minute in such a way that the films were applied only with a pressure of 100 g/cm$^2$ based on the weight of the jig. After the temperature had reached 1400° C., a compression pressure of 30 kg/cm$^2$ was applied to the films to a temperature of 1600° C. while keeping the heating rate of 10° C./minute. Thereafter, the pressure was removed so that only the weight of the jig of 100 g/cm$^2$ was applied until the temperature reached 2700° C. After the temperature reached 2700° C., a compression pressure of 300 kg/cm$^2$ was applied to the films, followed by heating to 3000° C. while keeping the pressure of 300 kg/cm$^2$, thereby obtaining a graphite block.

EXAMPLE 3

Two hundreds carbonaceous films which were obtained by thermal treatment of aromatic polyimide films (Kapton H film), each having a length of 2 cm, a width of 3 cm and a thickness of 25 $\mu$m, at a temperature of 1200° C., were set by use of a graphite jig.

The films were heated to 1400° C. in an atmosphere of argon gas at a heating rate of 10° C./minute in such a way that the films were applied only with a pressure of 100 g/cm$^2$ based on the weight of the jig. After the temperature had reached 1200° C., a compression pressure of 30 kg/cm$^2$ was applied to the films to a temperature of 1600° C. while keeping the heating rate of 10° C./minute. Thereafter, the pressure was removed so that only the weight of the jig of 100 g/cm$^2$ was applied until the temperature reached 2700° C. After the temperature reached 2700° C., a compression pressure of 300 kg/cm$^2$ was applied to the films, followed by heating to 3000° C. while keeping the pressure of 300 kg/cm², thereby obtaining a graphite block.

EXAMPLE 4

One hundred films of polybenzothiazole (PBT) with a length of 2 cm, a width of 3 cm and a thickness of 50 μm were set by use of a graphite jig and fired in the following manner.

The films were heated to 1500° C. in an atmosphere of argon gas at a heating rate of 10° C./minute in such a way that the films were applied only with a pressure of 100 g/cm² based on the weight of the jig. After the temperature had reached 1500° C., a compression pressure of 30 kg/cm² was applied to the films to a temperature of 1800° C. while keeping the heating rate of 10° C./minute. Thereafter, the pressure was removed so that only the weight of the jig of 100 g/cm² was applied until the temperature reached 2800° C. After the temperature reached 2800° C., a compression pressure of 300 kg/cm² was applied to the films, followed by heating to 3000° C. while keeping the pressure of 300 kg/cm², thereby obtaining a graphite block.

EXAMPLE 5

The general procedure of Example 4 was repeated except that polybenzobisthiazole (PBBT) films were used instead of PBT films, thereby obtaining graphite block.

EXAMPLE 6

The general procedure of Example 4 was repeated except that polybenzothiazole (PBO) films were used instead of PBT films, thereby obtaining graphite block.

EXAMPLE 7

The general procedure of Example 4 was repeated except that polybenzobisoxazole (PBBO) films were used instead of PBT films, thereby obtaining graphite block.

EXAMPLE 8

The general procedure of Example 4 was repeated except that aromatic polyimide (PI) films were used instead of PBT films, thereby obtaining graphite block.

EXAMPLE 9

The general procedure of Example 4 was repeated except that aromatic polyamide (PA) films were used instead of PBT films, thereby obtaining graphite block.

EXAMPLE 10

The general procedure of Example 4 was repeated except that polyphenylenebenzoimidazole (PBI) films were used instead of PBT films, thereby obtaining graphite block.

EXAMPLE 11

The general procedure of Example 4 was repeated except that polyphenylenebenzobisimidazole (PBBI) films were used instead of PBT films, thereby obtaining graphite block.

EXAMPLE 12

The general procedure of Example 4 was repeated except that polythiazole (PT) films were used instead of PBT films, thereby obtaining graphite block.

EXAMPLE 13

The general procedure of Example 4 was repeated except that polyparaphenylenevinylene (PPV) films were used instead of PBT films, thereby obtaining graphite block.

The graphite blocks obtained in Examples 1 to 13 had all a smooth surface which was substantially free of any wrinkle.

The graphite blocks were subjected to measurement of a rocking characteristic by the use of Rotor Flex RU-200B X-ray diffraction device, made by Rigaku Denki K.K. The rocking characteristic at the peak position of the (002) diffraction line of graphite is measured and determined as the half-value width of the obtained diffraction line.

The results are shown in Table 1 below.

TABLE 1

| Example | Polymer | Rocking Characteristic |
| --- | --- | --- |
| 1 | POD | 0.80° |
| 2 | PI | 0.70° |
| 3 | PI | 0.72° |
| 4 | PBT | 0.90° |
| 5 | PBBT | 1.00° |
| 6 | PBO | 0.88° |
| 7 | PBBO | 0.86° |
| 8 | PI | 0.82° |
| 9 | PA | 0.78° |
| 10 | PBI | 0.85° |
| 11 | PBBI | 0.90° |
| 12 | PT | 0.90° |
| 13 | PPV | 0.75° |

As will be apparent from the above results, the procedure is simple and the graphite blocks obtained in these examples have a good rocking characteristic. Thus, the blocks are suitably usable as X-ray and neutron ray monochromators and the like.

Examples of the second embodiment are described.

EXAMPLE 14

Fifty films of poly-p-phenylene-1,3,4-oxadiazole each having a length of 2 cm, a width of 3 cm and a thickness of 50 μm were set by use of a graphite jig and fired in the following manner.

The films were heated to 1200° C. in an atmosphere of argon gas at a heating rate of 10° C./minute in such a way that the films were applied only with a pressure of 100 g/cm² based on the weight of the jig. After the temperature had reached 1200° C., a compression pressure of 20 kg/cm² was applied to the films for 20 minutes while keeping the temperature of 1200° C. Thereafter, the pressure was removed so that only the weight of the jig of 100 g/cm² was applied until the temperature reached 2800° C. After the temperature reached 2800° C., a compression pressure of 200 kg/cm² was applied to the films for 30 minutes while keeping the temperature level, followed by reducing the pressure to 20 kg/cm² and heating to 3000° C., thereby obtaining a graphite block.

EXAMPLE 15

Two hundreds films of aromatic polyimide (Kapton H film, available from Du POnt De Nemours), each having a length of 2 cm, a width of 3 cm and a thickness of 25 μm, were set by use of a graphite jig and fired in the following manner.

The films were heated to 1400° C. in an atmosphere of argon gas at a heating rate of 10° C./minute in such a way that the films were applied only with a pressure of 100 g/cm$^2$ based on the weight of the jig. After the temperature had reached 1400° C., a compression pressure of 30 kg/cm$^2$ was applied to the films for 30 minutes while keeping the temperature level. Thereafter, the pressure was removed so that only the weight of the jig of 100 g/cm$^2$ was applied until the temperature reached 2700° C. After the temperature reached 2700° C., a compression pressure of 300 kg/cm$^2$ was applied to the films for 30 minutes while keeping the temperature level, followed by reducing the pressure to 10 kg/cm$^2$ and heating to 3000° C., thereby obtaining a graphite block.

EXAMPLE 16

Two hundreds carbonaceous films, which were obtained by thermally treating aromatic polyimide films (Kapton H film, available from Du POnt De Nemours), each having a length of 2 cm, a width of 3 cm and a thickness of 25 μm, at a temperature of 1000° C., were set by use of a graphite jig and fired in the following manner.

The films were heated to 1400° C. in an atmosphere of argon gas at a heating rate of 10° C./minute in such a way that the films were applied only with a pressure of 100 g/cm$^2$ based on the weight of the jig. After the temperature had reached 1400° C., a compression pressure of 30 kg/cm$^2$ was applied to the films for 30 minutes while keeping the temperature level. Thereafter, the pressure was removed so that only the weight of the jig of 100 g/cm$^2$ was applied until the temperature reached 2700° C. After the temperature reached 2700° C., a compression pressure of 300 kg/cm$^2$ was applied to the films for 30 minutes while keeping the temperature level, followed by reducing the pressure to 10 kg/cm$^2$ and heating to 3000° C., thereby obtaining a graphite block.

EXAMPLE 17

One hundred films of PBT, each having a length of 2 cm, a width of 3 cm and a thickness of 50 μm, were set by use of a graphite jig and fired in the following manner.

The films were heated to 1500° C. in an atmosphere of argon gas at a heating rate of 10° C./minute in such a way that the films were applied only with a pressure of 100 g/cm$^2$ based on the weight of the jig. After the temperature had reached 1500° C., a compression pressure of 30 kg/cm$^2$ was applied to the films for 30 minutes while keeping the temperature level. Thereafter, the pressure was removed so that only the weight of the jig of 100 g/cm$^2$ was applied until the temperature reached 2800° C. After the temperature reached 2800° C., a compression pressure of 300 kg/cm$^2$ was applied to the films for 30 minutes while keeping the temperature level, followed by reducing the pressure to 20 kg/cm$^2$ and heating to 3000° C., thereby obtaining a graphite block.

EXAMPLE 18

The general procedure of Example 17 was repeated except that polybenzobisthiazole (PBBT) films were used instead of PBT films, thereby obtaining graphite block.

EXAMPLE 19

The general procedure of Example 17 was repeated except that polybenzothiazole (PBO) films were used instead of PBT films, thereby obtaining graphite block.

EXAMPLE 20

The general procedure of Example 17 was repeated except that polybenzobisoxazole (PBBO) films were used instead of PBT films, thereby obtaining graphite block.

EXAMPLE 21

The general procedure of Example 17 was repeated except that aromatic polyimide (PI) films were used instead of PBT films, thereby obtaining graphite block.

EXAMPLE 22

The general procedure of Example 17 was repeated except that aromatic polyamide (PA) films were used instead of PBT films, thereby obtaining graphite block.

EXAMPLE 23

The general procedure of Example 17 was repeated except that polyphenylenebenzolmidazole (PBI) films were used instead of PBT films, thereby obtaining graphite block.

EXAMPLE 24

The general procedure of Example 17 was repeated except that polyphenylenebenzobisimidazole (PBBI) films were used instead of PBT films, thereby obtaining graphite block.

EXAMPLE 25

The general procedure of Example 17 was repeated except that polythiazole (PT) films were used instead of PBT films, thereby obtaining graphite block.

EXAMPLE 26

The general procedure of Example 17 was repeated except that polyparaphenylenevinylene (PPV) films were used instead of PBT films, thereby obtaining graphite block.

The graphite blocks obtained in Examples 14 to 26 had all a very smooth surface which was substantially free of any wrinkle.

The thus obtained blocks were subjected to the measurement of the rocking characteristic in the same manner as in the foregoing examples. The results are shown in Table 2 below.

TABLE 2

| Example | Polymer | Rocking Characteristic |
|---|---|---|
| 14 | POD | 0.60° |
| 15 | PI | 0.55° |
| 16 | PI | 0.58° |
| 17 | PBT | 0.65° |
| 18 | PBBT | 0.80° |
| 19 | PBO | 0.64° |
| 20 | PBBO | 0.60° |
| 21 | PI | 0.60° |
| 22 | PA | 0.58° |
| 23 | PBI | 0.62° |
| 24 | PBBI | 0.70° |
| 25 | PT | 0.70° |
| 26 | PPV | 0.65° |

The results of Table 2 are better than those of Table 1. Thus, the Process of the second embodiment is improved over that of the first embodiment. More particularly, the application of the compression pressure while keeping a given temperature level in a certain temperature range is effective in improving the rocking characteristic.

Examples of the third embodiment of the invention are described.

EXAMPLE 27

Fifty films of poly-p-phenylene-1,3,4-oxadiazole, each having a length of 2 cm, a width of 3 cm and a thickness of 50 $\mu$m, were set by use of a graphite jig and fired in the following manner.

The films were heated to 1200° C. in an atmosphere of argon gas at a heating rate of 10° C./minute in such a way that the films were applied only with a pressure of 100 g/cm$^2$ based on the weight of the jig. After the temperature had reached 1200° C., a compression pressure of 20 kg/cm$^2$ was applied to the films to 1400° C. while keeping the heating rate at 10° C./minute. Thereafter, the pressure was removed so that only the weight of the jig of 100 g/cm$^2$ was applied until the temperature reached 2600° C. After the temperature reached 2600° C., a compression pressure of 200 kg/cm$^2$ was applied to the films, followed by heating up to 3000° C. while keeping the pressure at 200 kg/cm$^2$. In a temperature range over 3000° C., the pressure was reduced to 10 kg/cm$^2$ until the temperature reached 3200° C., thereby obtaining a graphite block.

EXAMPLE 28

Fifty films of poly-p-phenylene-1,3,4-oxadiazole, each having a length of 2 cm, a width of 3 cm and a thickness of 50 $\mu$m, were set by use of a graphite jig and fired in the following manner.

The films were heated to 1200° C. in an atmosphere of argon gas at a heating rate of 10° C./minute in such a way that the films were applied only with a pressure of 100 g/cm$^2$ based on the weight of the jig. After the temperature had reached 1200° C., a compression pressure of 20 kg/cm$^2$ was applied to the films while keeping the temperature level. Thereafter, the pressure was removed so that only the weight of the jig of 100 g/cm$^2$ was applied until the temperature reached 2600° C. After the temperature reached 2600° C., a compression pressure of 200 kg/cm$^2$ was applied to the films while keeping the temperature level. Thereafter, the pressure was reduced and when the temperature reached 3200° C., a pressure of 10 kg/cm$^2$ was applied for 30 minutes while keeping the temperature level, thereby obtaining a graphite block.

EXAMPLE 29

Two hundreds films of aromatic polyimide (Kapton H film, available from Du Pont De Nemours), each having a length of 2 cm, a width of 3 cm and a thickness of 25 $\mu$m, were set by use of a graphite jig and fired in the following manner.

The films were heated to 1400° C. in an atmosphere of argon gas at a heating rate of 10° C./minute in such a way that the films were applied only with a pressure of 100 g/cm$^2$ based on the weight of the jig. After the temperature had reached 1400° C., a compression pressure of 30 kg/cm$^2$ was applied to the films to a temperature of 1600° C. while keeping the heating rate. Thereafter, the pressure was removed so that only the weight of the jig of 100 g/cm$^2$ was applied until the temperature reached 2700° C. After the temperature reached 2700° C., a compression pressure of 300 kg/cm$^2$ was applied to the films to a level of 3000° C. In a temperature range over 3000°, the pressure was reduced to 20 kg/cm$^2$ until the temperature reached 3200° C., thereby obtaining a graphite block.

EXAMPLE 30

Two hundreds aromatic polyimide films (Kapton H film, available from Du POnt De Nemours), each having a length of 2 cm, a width of 3 cm and a thickness of 25 $\mu$m, were stacked and set by use of a graphite jig and fired in the following manner.

The films were heated to 1400° C. in an atmosphere of argon gas at a heating rate of 10° C./minute in such a way that the films were applied only with a pressure of 100 g/cm$^2$ based on the weight of the jig. After the temperature had reached 1400° C., a compression pressure of 30 kg/cm$^2$ was applied to the films while keeping the temperature level. Thereafter, the pressure was removed so that only the weight of the jig of 100 g/cm$^2$ was applied until the temperature reached 2700° C. After the temperature reached 2700° C., a compression pressure of 300 kg/cm$^2$ was applied to the films for 30 minutes while keeping the temperature level, followed by reducing the pressure to 10 kg/cm$^2$ and heating to 3000° C. at which a pressure of 20 kg/cm$^2$ was applied for 30 minutes, thereby obtaining a graphite block.

EXAMPLE 31

One hundred films of PBT, each having a length of 2 cm, a width of 3 cm and a thickness of 50 $\mu$m, were stacked and set by use of a graphite jig and fired in the following manner.

The films were heated to 1500° C. in an atmosphere of argon gas at a heating rate of 10° C./minute in such a way that the films were applied only with a pressure of 100 g/cm$^2$ based on the weight of the jig. After the temperature had reached 1500° C., a compression pressure of 30 kg/cm$^2$ was applied to the films to a temperature of 1800° C. while keeping the heating rate. Thereafter, the pressure was removed so that only the weight of the jig of 100 g/cm$^2$ was applied until the temperature reached 2800° C. After the temperature reached 2800° C., a compression pressure of 300 kg/cm$^2$ was applied to the films, followed by heating the films to 3000° C. while maintaining the pressure at 300 kg/cm$^2$. In a temperature range over 3000° C., the pressure was reduced to 20 kg/cm$^2$ under which heating was continued to a temperature of 3200° C., thereby obtaining a graphite block.

EXAMPLE 32

The general procedure of Example 31 was repeated except that polybenzobisthiazole (PBBT) films were used instead of PBT films, thereby obtaining graphite block.

EXAMPLE 33

The general procedure of Example 31 was repeated except that polybenzothiazole (PBO) films were used instead of PBT films, thereby obtaining graphite block.

EXAMPLE 34

The general procedure of Example 31 was repeated except that polybenzobisoxazole (PBBO) films were used instead of PBT films, thereby obtaining graphite block.

EXAMPLE 35

The general procedure of Example 31 was repeated except that aromatic polyimide (PI) films were used instead of PBT films, thereby obtaining graphite block.

EXAMPLE 36

The general procedure of Example 31 was repeated except that aromatic polyamide (PA) films were used instead of PBT films, thereby obtaining graphite block.

EXAMPLE 37

The general procedure of Example 31 was repeated except that polyphenylenebenzoimidazole (PBI) films were used instead of PBT films, thereby obtaining graphite block.

EXAMPLE 38

The general procedure of Example 31 was repeated except that polyphenylenebenzobisimidazole (PBBI) films were used instead of PBT films, thereby obtaining graphite block.

EXAMPLE 39

The general procedure of Example 31 was repeated except that polythiazole (PT) films were used instead of PBT films. thereby obtaining graphite block.

EXAMPLE 40

The general procedure of Example 31 was repeated except that polyparaphenylenevinylene (PPV) films were used instead of PBT films, thereby obtaining graphite block.

The graphite blocks obtained in Examples 27 to 40 had all a very smooth surface which was substantially free of any wrinkle.

The thus obtained blocks were subjected to the measurement of the rocking characteristic in the same manner as in the foregoing examples. The results are shown in Table 3 below.

TABLE 3

| Example | Polymer | Rocking Characteristic |
|---|---|---|
| 27 | POD | 0.50° |
| 28 | POD | 0.40° |
| 29 | PI | 0.40° |
| 30 | PI | 0.36 |
| 31 | PBT | 0.62° |
| 32 | PBBT | 0.60° |
| 33 | PBO | 0.58° |
| 34 | PBBO | 0.50° |
| 35 | PI | 0.44° |
| 36 | PA | 0.42° |
| 37 | PBI | 0.50° |
| 38 | PBBI | 0.55° |
| 39 | PT | 0.60° |
| 40 | PPV | 0.45° |

Better results are obtained in the examples of this embodiment. Especially, the comparison between the results of Example 27 and the results of Example 1 reveals that the application of the compression pressure ranging from 2 to 50 kg/cm$^2$ in a temperature range over 3000° C. is effective in improving the rocking characteristic or the orientation of the graphite crystals.

Examples of the fourth embodiment of the invention are described.

EXAMPLE 41

Fifty films of poly-p-phenylene-1,3,4-oxadiazole, each having a length of 2 cm, a width of 3 cm and a thickness of 50 μm, were superposed and set by use of a graphite jig and fired in the following manner.

The films were heated to 1200° C. in an atmosphere of argon gas at a heating rate of 10° C./minute in such a way that the films were applied only with a pressure of 100 g/cm$^2$ based on the weight of the jig. After the temperature had reached 1200° C., a compression pressure of 20 kg/cm$^2$ was applied to the films to 1400° C. while keeping the heating rate at 10° C./minute. Thereafter, the pressure was removed so that only the weight of the jig of 100 g/cm$^2$ was applied until the temperature reached 2600° C. After the temperature reached 2600° C., a compression pressure of 200 kg/cm$^2$ was applied to the films, followed by heating up to 3000° C. while keeping the pressure at 200 kg/cm$^2$. Subsequently, the temperature was lowered down to 1200° C. while applying a pressure of 200 kg/cm$^2$, at which the films were maintained for 30 minutes. Then, the pressure was kept at 20 kg/cm$^2$ under which the films were heated to 2600° C. at a heating rate of 10° C./minute, followed by heating from 2600° to 3000° C. at a pressure of 200 kg/cm$^2$, thereby obtaining graphite block.

EXAMPLE 42

Two hundreds aromatic polyimide films (Kapton H film, available from Du Pont De Nemours), each having a length of 2 cm, a width of 3 cm and a thickness of 25 μm, were stacked and set by use of a graphite jig and fired in the following manner.

The films were heated to 1400° C. in an atmosphere of argon gas at a heating rate of 10° C./minute in such a way that the films were applied only with a pressure of 100 g/cm$^2$ based on the weight of the jig. After the temperature had reached 1400° C., a compression pressure of 30 kg/cm$^2$ was applied to the films to a temperature of 1600° C. while keeping the heating rate. Thereafter, the pressure was removed so that only the weight of the jig of 100 g/cm$^2$ was applied until the temperature reached 2700° C. After the temperature reached 2700° C., a compression pressure of 300 kg/cm$^2$ was applied to the films and heating was continued to a temperature of 3000° C. while keeping the pressure at 300 kg/cm$^2$. Subsequently, the temperature was lowered to 1000° C. while keeping the pressure at 200 kg/cm$^2$, at which the films were kept for 30 minutes. Thereafter, the films were heated at a rate of 10° C./minute to a temperature of 2700° C. while applying a pressure of 10 kg/cm. In a temperature range over 2700° C., a pressure of 200 kg/cm$^2$ was applied until the temperature reached 3000° C., thereby obtaining a graphite block.

EXAMPLE 43

One hundred films of PBT, each having a length of 2 cm, a width of 3 cm and a thickness of 50 μm, were stacked and set by use of a graphite jig and fired in the following manner.

The films were heated to 1500° C. in an atmosphere of argon gas at a heating rate of 10° C./minute in such a way that the films were applied only with a pressure of 100 g/cm$^2$ based on the weight of the jig. After the temperature had reached 1500° C., a compression pressure of 30 kg/cm$^2$ was applied to the films to a temperature of 1800° C. while keeping the heating rate. Thereafter, the pressure was removed so that only the weight of the jig of 100 g/cm² was applied until the temperature reached 2800° C. After the temperature reached 2800° C., a compression pressure of 300 kg/cm² was applied to the films, followed by heating the films to 3000° C. while maintaining the pressure at 300 kg/cm². Subsequently, the temperature was lowered to 800° C. while applying a pressure of 300 kg/cm², followed by keeping as it is for 30 minutes. The films were again heated at a rate of 20° C./minute to a temperature of 2800° C. while keeping the pressure at 10 kg/cm². In a temperature range over 2800° C., the pressure was increased to 200 kg/cm², followed by heating to a temperature of 3000° C., thereby obtaining a graphite block.

EXAMPLE 44

The general procedure of Example 43 was repeated except that PBBT films were used instead of PBT films, thereby obtaining graphite block.

EXAMPLE 45

The general procedure of Example 43 was repeated except that polybenzothlazole (PBO) films were used instead of PBT films, thereby obtaining graphite block.

EXAMPLE 46

The general procedure of Example 43 was repeated except that polybenzobisoxazole (PBBO) films were used instead of PBT films, thereby obtaining graphite block.

EXAMPLE 47

The general procedure of Example 43 was repeated except that aromatic polyimide (PI) films were used instead of PBT films, thereby obtaining graphite block.

EXAMPLE 48

The general procedure of Example 43 was repeated except that aromatic polyamide (PA) films were used instead of PBT films, thereby obtaining graphite block.

EXAMPLE 49

The general procedure of Example 43 was repeated except that polyphenylenebenzoimidazole (PBI) films were used instead of PBT films, thereby obtaining graphite block.

EXAMPLE 50

The general procedure of Example 43 was repeated except that polyphenylenebenzobisimidazole (PBBI) films were used instead of PBT films, thereby obtaining graphite block.

EXAMPLE 51

The general procedure of Example 43 was repeated except that polythiazole (PT) films were used instead of PBT films, thereby obtaining graphite block.

EXAMPLE 52

The general procedure of Example 43 was repeated except that polyparaphenylenevinylene (PPV) films were used instead of PBT films, thereby obtaining graphite block.

The graphite blocks obtained in Examples 41 to 52 had all a very smooth surface which was substantially free of any wrinkle.

The thus obtained blocks were subjected to the measurement of the rocking characteristic in the same manner as in the foregoing examples. The results are shown in Table 4 below.

TABLE 4

| Example | Polymer | Rocking Characteristic |
|---|---|---|
| 41 | POD | 0.60° |
| 42 | PI | 0.45° |
| 43 | PBT | 0.67° |
| 44 | PBBT | 0.70° |
| 45 | PBO | 0.64° |
| 46 | PBBO | 0.62° |
| 47 | PI | 0.62° |
| 48 | PA | 0.55° |
| 49 | PBI | 0.60° |
| 50 | PBBI | 0.70° |
| 51 | PT | 0.68° |
| 52 | PPV | 0.50° |

The above results of these examples are better than and are improved over those of Examples 1 to 13 although slightly inferior to those of Examples 27 to 40.

Examples of the fifth embodiment wherein a greater number of graphitizable polymer or carbonaceous films are used to obtain a thicker block with a large area are described.

EXAMPLE 53

One thousand aromatic polyimide films (Kapton film), each having a thickness of 25 μm, were superposed and graphitized in the following manner.

The films were thermally treated in vacuum (a degree of vacuum of $\cong 1 \times 10^{-3}$ Torr.) at a pressure of 500 g/cm² in a temperature range of from normal temperatures to 300° C. at a heating rate of 5° C./minute, followed by thermal treatment in an atmosphere of argon. At 3000° C. which was in a temperature range over the graphitization temperature, the films were treated at a compression pressure of 200 kg/cm², under which they were kept for 1 hour, thereby obtaining a 1 cm thick graphite block with a size of 16 cm in square.

COMPARATIVE EXAMPLE 1

The general procedure of Example 53 was repeated except that the films were heated from normal temperatures at a pressure of 200 kg/cm² in an argon atmosphere, thereby obtaining a 1 cm thick graphite block with a size of 16 cm in square.

EXAMPLE 54

One thousand aromatic polyimide films (Kapton film), each having a thickness of 25 μm, were superposed and graphitized in the following manner.

The films were thermally treated in vacuum (a degree of vacuum of $\cong 1 \times 10^{-3}$ Torr.) at a pressure of 500 g/cm² in a temperature range of from normal temperatures to 300° C. at a heating rate of 5° C./minute, followed by thermal treatment in an atmosphere of argon. Then, the films were maintained at a thermal carbonization temperature of 500° C. for 2 hours and further thermally treated at 3000° C., which was in a temperature range over the graphitization temperature of 500° C., at a compression pressure of 200 kg/cm², under which they were kept for 1 hour, thereby obtaining a 1 cm thick graphite block with a size of 16 cm in square.

EXAMPLE 55

Five hundreds aromatic polyamide films with a thickness of 50 μm were superposed and graphitized in the following manner.

The films were thermally treated in vacuum (a degree of vacuum of $\cong 1\times 10^{-3}$ Torr.) at a pressure of 800 g/cm² in a temperature range of from normal temperatures to 300° C. at a heating rate of 3° C./minute, followed by thermal treatment in an atmosphere of argon. The films were maintained at a thermal carbonization temperature of 450° C. for 2 hours and then thermally treated at 3000° C., which was in a temperature range over the graphitization temperature, at a compression pressure of 300 kg/cm², under which they were kept for 1 hour, thereby obtaining a 1 cm thick graphite block with a size of 16 cm in square.

COMPARATIVE EXAMPLE 2

The general procedure of Example 55 was repeated except that a compression pressure of 300 kg/cm² was applied from normal temperatures in an atmosphere of argon, thereby obtaining a 1 cm thick graphite block with a size of 16 cm in square.

EXAMPLE 56

Five hundreds polyoxadiazole films each having a thickness of 50 μm were superposed and graphitized in the following manner.

The films were thermally treated in vacuum (a degree of vacuum of $\cong 1\times 10^{-3}$ Torr.) at a pressure of 600 g/cm² in a temperature range of from normal temperatures to 250° C. at a heating rate of 2° C./minute, followed by thermal treatment in an atmosphere of argon. The films were thermally treated at 3000° C., which was in a temperature range over the graphitization temperature, at a compression pressure of 400 kg/cm², under which they were kept for 2 hours, thereby obtaining a 1 cm thick graphite block with a size of 16 cm in square.

COMPARATIVE EXAMPLE 3

The general procedure of example 56 was repeated except that the films were applied with a pressure of 400 kg/cm² from normal temperatures in an atmosphere of argon, thereby obtaining a 1 cm thick graphite block with an area of 16 cm in square.

The graphite blocks obtained in the above examples and comparative examples were cut into 64 pieces with a size of 2 cm square. The rocking characteristic of the respective pieces were determined. The results are shown in Table 5.

TABLE 5

| Rocking Characteristic (°) | Example | | | | Comparative Ex. | | |
|---|---|---|---|---|---|---|---|
| | 53 | 54 | 55 | 56 | 1 | 2 | 3 |
| | (Number of Pieces) | | | | | | |
| <0.5 | 0 | 1 | 0 | 0 | 0 | 0 | 0 |
| 0.5–<0.6 | 1 | 2 | 0 | 0 | 0 | 0 | 0 |
| 0.6–<0.7 | 2 | 3 | 1 | 0 | 0 | 1 | 0 |
| 0.7–<0.8 | 2 | 5 | 2 | 2 | 1 | 2 | 1 |
| 0.8–<0.9 | 4 | 16 | 4 | 4 | 4 | 3 | 1 |
| 0.9–<1.0 | 19 | 14 | 16 | 5 | 7 | 5 | 3 |
| 1.0–<1.1 | 15 | 10 | 15 | 10 | 10 | 9 | 7 |
| 1.1–<1.2 | 10 | 4 | 13 | 18 | 12 | 10 | 10 |
| 1.2–<1.3 | 4 | 2 | 9 | 12 | 11 | 15 | 15 |
| 1.3–<1.4 | 4 | 2 | 2 | 9 | 9 | 13 | 13 |
| 1.4–<1.5 | 2 | 0 | 2 | 3 | 7 | 7 | 10 |
| 1.5< | 1 | 0 | 1 | 1 | 3 | 6 | 5 |

As will be apparent from the above results, with Example 53, the rocking characteristic is concentrated to a range of from 0.9° to 1.1°, whereas with Comparative example 1, its value is distributed to a wider range of from 0.9° to 1.4°. On average, the rocking characteristic of Example 53 is 1.04 and that of Comparative Example 1 is 1.18°. Thus, the process of this embodiment contributes to a lower average value with a sharp distribution.

With Example 54, the rocking characteristic is concentrated at a level of about 0.8° with an average value of 0.85°, which is better than in Example 53. Thus, to keep the films at a carbonization temperature is effective in improving the rocking characteristic.

With Example 55, the rocking characteristic is concentrated at a level of from 0.9 to 1.2. In Comparative Example 2, the value is distributed to a wider range of from 0.9° to 1.5°. The average value is 1.09° for Example 55 and 1.34° for Comparative Example 2.

Likewise, with Example 56, the rocking characteristic is concentrated at a level of from 0.9 to 1.4. In Comparative Example 3, the value is distributed to a wider range of from 0.9° to 1.5°. The average value is 1.15° for Example 55 and 1.26° for Comparative Example 3.

What is claimed is:

1. A process for producing a graphite block from a plurality of graphitizable polymer films or a plurality of carbonaceous films separately obtained from graphitizable polymer films, which process comprises:
   superposing the plurality of the graphitizable polymer films or the plurality of the carbonaceous films; and
   thermally treating the plurality of the graphitizable polymer films or the plurality of the carbonaceous films in first, second, third and fourth temperature ranges, the first temperature range being from the temperature at which carbonization of the films begins to a temperature at which any dimensional changes in the films resulting from carbonization are complete, the second temperature range being from the temperature at which any dimensional changes in the films resulting from carbonization are complete to approximately 2000° C., the third temperature range being from approximately 2000° C. to approximately 2600° C., and the fourth temperature range being over approximately 2600° C., wherein the thermal treatment is conducted under substantially compression pressure-free conditions in the first and third temperature ranges, and the thermal treatment is conducted under compression pressures in the second and fourth temperature ranges, and the compression pressure in the fourth temperature range being higher than the compression pressure in the second temperature range.

2. A process according to claim 1, wherein prior to the thermal treatment in the second temperature range, the plurality of the graphitizable polymer films or the plurality of the carbonaceous films are thermally treated up to the carbonization temperature in a substantially compression pressure-free condition.

3. A process according to claim 1, wherein the compression pressure in the second temperature range is in the range of from 2 to 50 kg/cm².

4. A process according to claim 1, wherein the compression pressure in the fourth temperature range is not lower than 50 kg/cm².

5. A process according to claim 1, wherein the superposed films are thermally treated (a) at a compression pressure of from 2 to 50 kg/cm² in the second temperature range, (b) in a substantially pressure-free condition in the third temperature range of from 2000° to 2600° C., (c) at a compression pressure of not lower than 50 kg/cm² in the fourth temperature range wherein the temperature is from 2600° to 3000° C., and (d) at a compression pressure of from 2 to 50 kg/cm² in the fourth temperature range wherein the temperature is greater than 3000° C.

6. A process according to claim 1, wherein when a compression pressure of not lower than 10 kg/cm² is applied in the second temperature range, the thermal treatment is maintained at a substantially constant temperature during the application of the compression pressure, and when a compression pressure of not lower than 50 kg/cm² is applied in the fourth temperature range of not lower than 2600° C., the thermal treatment is maintained at a substantially constant temperature during the application of the compression pressure.

7. A process according to claim 6, wherein the thermal treatment is effected in such a way that when the compression pressure in the second temperature range is applied in a range of not lower than 10 kg/cm², the thermal treatment is maintained at a substantially constant temperature in the second temperature range, and when the compression pressure in the fourth temperature range is applied in a range of not lower than 50 kg/cm², the thermal treatment is maintained at a substantially constant temperature in the fourth temperature range.

8. A process according to claim 7, wherein the compression pressure in the second temperature range is not lower than 20 kg/cm².

9. A process according to claim 7, wherein the compression pressure in the fourth temperature range is 100 to 500 kg/cm².

10. A process according to claim 1, further comprising at least once lowering the resultant block to a temperature in a range of not higher than 1600° C. and then heating to a temperature in a range of not lower than 2600° C.

11. A process according to claim 10, wherein after the reheating to a temperature in the range of not lower than 2600° C., the films are compressed at least once.

12. A process according to claim 10, wherein when reheated, the films are compressed at a pressure of not higher than 20 kg/cm² to a temperature of not higher than 2600° C. and at a pressure of not lower than 20 kg/cm² over a temperature of 2600° C.

13. A process according to claim 10, wherein during the lowering to a temperature in a range of not higher than 1600° C., the pressure applied prior to the lowering is maintained down to a temperature of 2000° C.

14. A process according to claim 1, wherein the graphitizable polymer film is a film of a polymer selected from the group consisting of polyphenyleneoxadiazoles, polybenzothiazole, polybenzobisthiazole, polybenzooxazole, polybenzobisoxazole, aromatic polyimides, aromatic polyamides, polyphenylenebenzoimidazole, polyphenylenebenzobismidazole, polythiazole, poly-p-phenylenevinylene and mixtures thereof.

15. A process according to claim 5, wherein in at least one of steps (a), (c) and (d), the temperature is maintained substantially constant during application of the compression pressure.

16. A process according to claim 5, wherein in each of the steps (a), (c) and (d), the temperature is maintained substantially constant during application of the compression pressure.

17. A process according to claim 1, wherein the first temperature range is from approximately 400° C. to 1000° C.

18. A process according to claim 1, wherein each film has a thickness not larger than 400 μm.

* * * * *